3 Sheets—Sheet 1.

E. FOERSTER.

MACHINE FOR SAWING STONE.

No. 10,844. Reissued June 14, 1887.

WITNESSES:

Gustave Dietrich

William Goebel.

INVENTOR

Emanuel Foerster

BY Briesen & Steele

ATTORNEYS.

N. PETERS, Photo-Lithographer, Washington, D. C.

3 Sheets—Sheet 2.

E. FOERSTER.

MACHINE FOR SAWING STONE.

No. 10,844. Reissued June 14, 1887.

WITNESSES:

Gustave Kieferle

William Goebel.

INVENTOR

Emanuel Foerster

BY Briesen & Steele

ATTORNEYS.

N. PETERS, Photo-Lithographer, Washington, D. C.

3 Sheets—Sheet 3.

E. FOERSTER.

MACHINE FOR SAWING STONE.

No. 10,844. Reissued June 14, 1887.

WITNESSES:

Gustave Peterich

William Goebel.

INVENTOR

Emanuel Foerster

BY Briesen & Steele

ATTORNEYS.

N. PETERS. Photo-Lithographer, Washington, D. C.

UNITED STATES PATENT OFFICE.

EMANUEL FOERSTER, OF NEW YORK, N. Y.

MACHINE FOR SAWING STONE.

SPECIFICATION forming part of Reissued Letters Patent No. 10,844, dated June 14, 1887.

Original No. 340,205, dated April 20, 1886. Application for reissue filed February 10, 1887. Serial No. 227,219.

*To all whom it may concern:*

Be it known that I, EMANUEL FOERSTER, of the city, county, and State of New York, have invented certain new and useful Improvements in Machines for Sawing Stone, of which the following is a specification.

This invention relates to machines for sawing stone, in which saws armed with diamonds or other hard stones are used as cutting-tools; and the invention consists of a machine for sawing stone in which a reciprocating sash that supports the saw-blade is raised by suitable mechanism at the end of each stroke and lowered at the beginning of the next stroke, so that the kerf can be cleared of débris, while the saw exerts a cutting action both on the forward and return stroke.

The invention consists, further, of mechanism for feeding the saw-blade forward at or near the end of each stroke, and of a novel construction of sash, as will be more fully hereinafter set forth.

Figure 1:
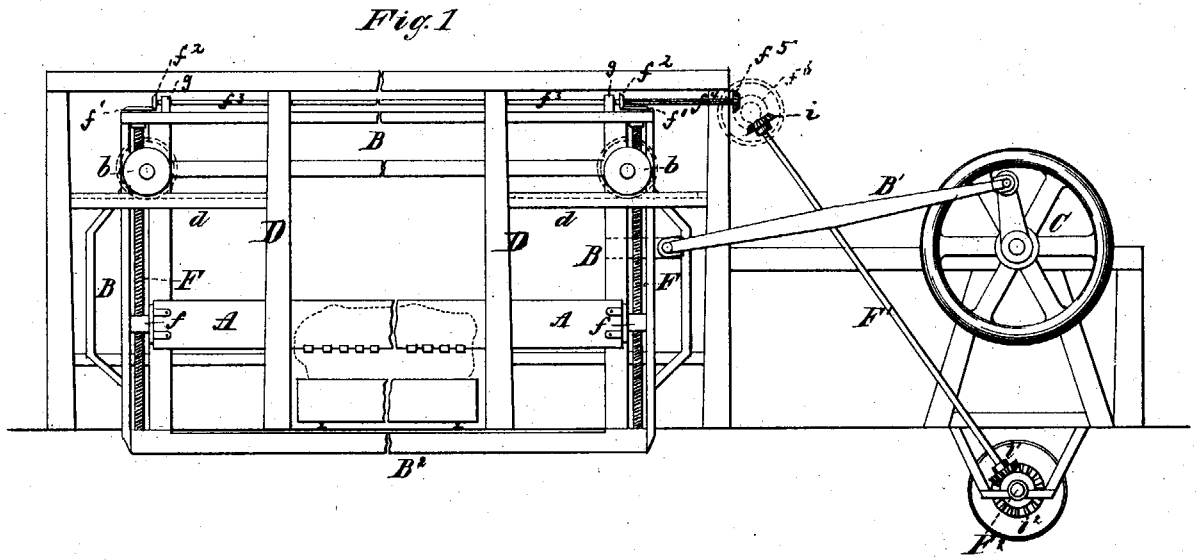
Figure 2:
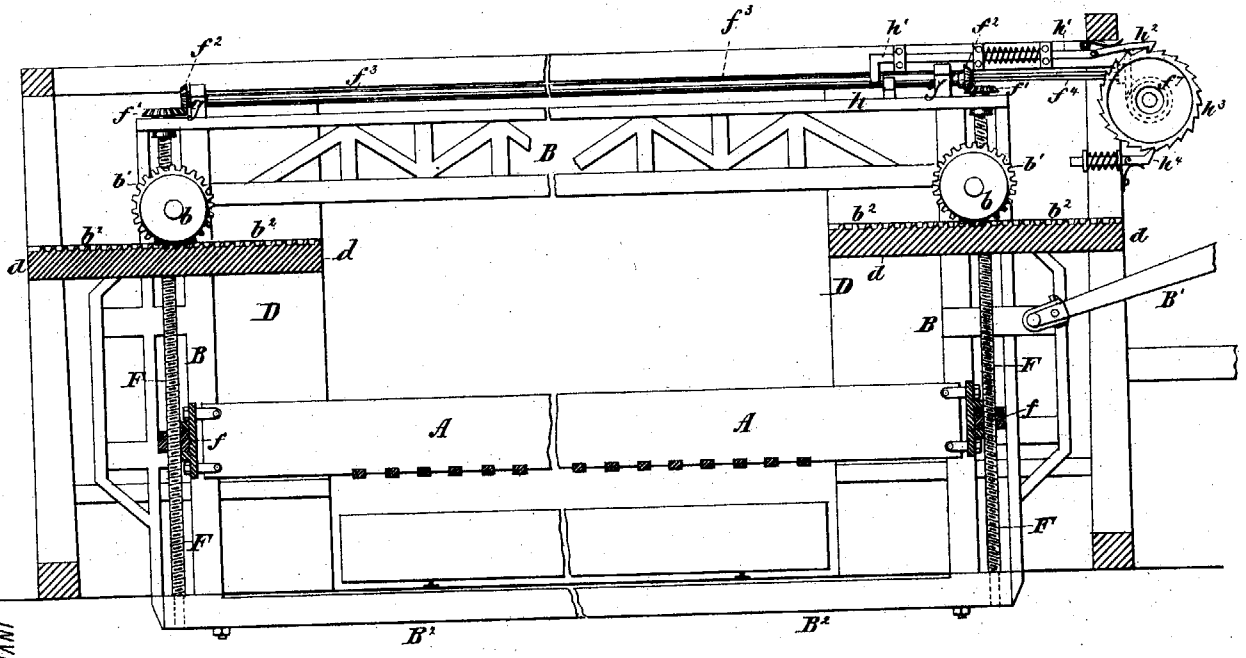
Figure 3:
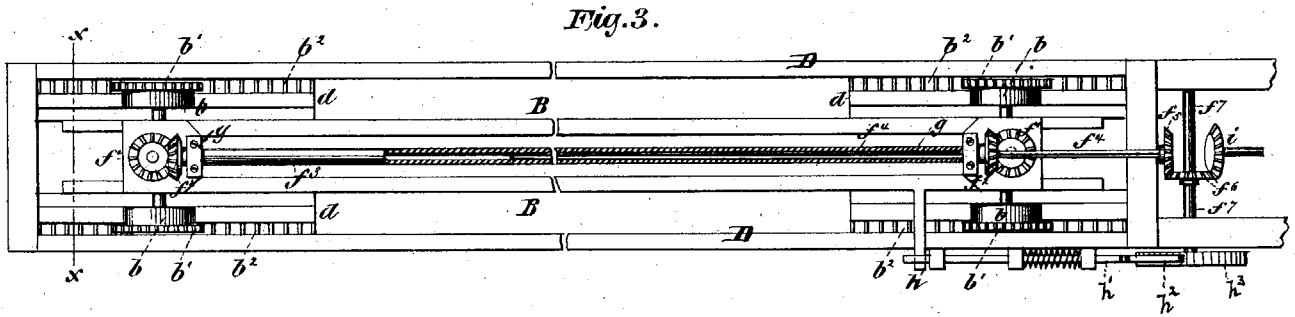
Figure 5:
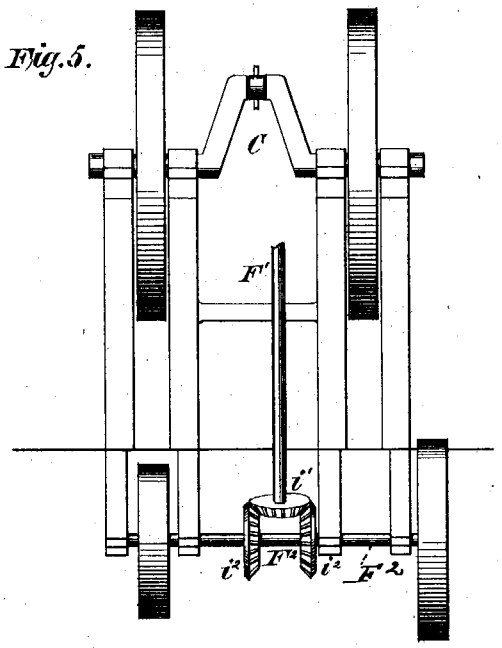
Figure 4:
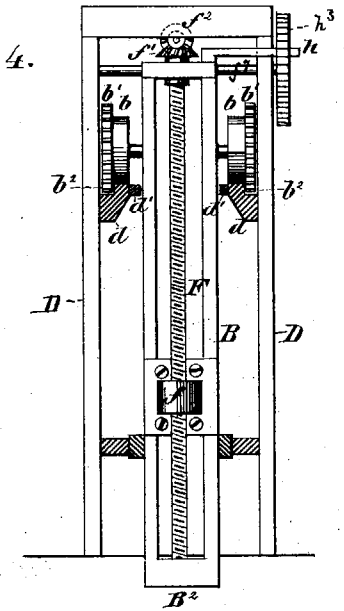

In the accompanying drawings, Figure 1 represents a side elevation of my improved machine for sawing stone, showing one form or modification of mechanism for feeding the saw. Fig. 2 is a vertical longitudinal section of the same, drawn on a larger scale, showing another form of mechanism for feeding the saw. Fig. 3 is a plan view, partly in section. Fig. 4 is a vertical transverse section of the same on the line *x x*, Fig. 3; and Fig. 5 is an end elevation of the mechanism by which reciprocating and vertical up-and-down motion is imparted to the saw-blade and its sash.

Similar letters of reference represent corresponding parts.

A in the drawings represents a saw-blade, which is supported in the usual manner by a sash, B. The saw-blade A is mounted with a number of teeth having diamonds inserted therein in any approved manner. The sash B receives reciprocating motion by a pitman, B′, from a driving crank-shaft, C, Fig. 1. The sash B is supported by rollers *b b* on horizontal ways *d d* of the supporting-frame D of the machine, and guided by cushions *d′* of said ways, which cushions steady the sash and prevent lateral vibrations of the same. The rollers *b b* are provided with toothed eccentric flanges *b′ b′*, which engage racks $b^2$ of the ways *d*. The eccentric portions of the toothed flanges *b′ b′* are so arranged that when the sash arrives near to the end of each stroke it is lifted by the eccentricity of the flanges sufficiently to withdraw the blade from the kerf of the stone and permit the débris to be washed away by the water supplied to the kerf. At the beginning of the next stroke the sash and its blade are lowered again.

In place of the toothed eccentric flanges, smooth eccentric flanges may be used, which are guided in smooth grooves of the ways *d*; or any equivalent mechanism may be used by which the sash-frame, with the saw, is lifted when arriving nearly at the end of its stroke. The ways *d* and the circumference of the toothed eccentric flanges are equal in length to the length of the stroke of the saw-blade.

The sash B is made of the usual construction in stone-sawing machines; the sides of the sash being extended downward and connected at their lower ends by a longitudinal stiffening-piece, $B^2$, which extends transversely below the track on which the stone-supporting carriage is placed, and which serves for imparting greater rigidity to the sash, so as to give a better support for the saw-blade and diminish the longitudinal vibrations of the same.

The saw-blade is adjusted by traversing screw-nuts *f* at both ends on vertical screw-rods F, that turn in bearings at the upper and lower parts of the sash. The screw-rods F are provided with bevel-wheels *f′* at the upper ends, which mesh with bevel-wheels $f^2$, that are applied to the opposite ends of a hollow shaft, $f^3$, having a longitudinal opening of square cross-section. A transmitting-shaft, $f^4$, of square cross-section, is extended through the hub of one bevel-wheel, $f^2$, into the hollow shaft $f^3$, the shaft $f^4$ meshing by a bevel-wheel, $f^5$, at its end with a bevel-wheel, $f^6$, of a transverse shaft, $f^7$. The tubular shaft $f^3$ is supported in bearings *g* of the sash B at the top part of said sash and moved along with same, so as to slide along the square shaft $f^4$ by the reciprocating motion of the sash.

A sidewise-projecting lug, *h*, is attached to the top part of the sash B, and serves to engage the downwardly-bent end of a horizontally-guided and spring-actuated rod, *h′*, which is provided at its opposite end with a spring-pawl, $h^2$, that engages a ratchet-wheel, $h^3$, on the shaft $f^7$, as shown in Figs. 2 and 3. A second spring-actuated pawl, $h^4$, engages the ratchet-wheel $h^3$ at a point diametrically opposite to the pawl $h^2$, and serves to turn the ratchet-wheel $h^3$ alternately with the pawl $h^2$. At each forward stroke of the sash the spring-actuated rod $h'$ is engaged by the lug $h$, and at each return-stroke the shank of the pawl $h^4$ is pushed by the sash, and thereby the ratchet-wheel $h^3$ turned for the distance of a few teeth, which motion is transmitted, by the shaft $f^7$, bevel-wheels $f^6$ $f^5$, shafts $f^4$ $f^3$, and bevel-wheels $f^2$ $f'$, to the screw-rods F, and by the same to the traversing screw-nuts $f$ of the saw-blade, so that the latter is gradually advanced into the kerf of the stone as the same is deepened by the cutting action of the saw.

Instead of the ratchet-wheel and pawls, I can use for feeding the saw the device shown in Fig. 1. In this figure an inclined shaft, F', is supported in suitable bearings and provided at the upper end with a bevel-wheel, $i$, that meshes with the bevel-wheel $f^6$ on the shaft $f^7$. A bevel-wheel, $i'$, at the lower end of the shaft F' meshes with bevel-wheels $i^2$ on a counter-shaft, $F^2$, that turns in bearings below the support for the driving crank-shaft C, as shown in Figs. 1 and 5. When rotary motion is imparted to the shaft $F^2$ by a belt and pulley, the blade is raised or lowered as desired. In that case the belt is shifted by lever and belt-shifting device (not shown in the drawings) which is customary in stone-sawing machines; but rotary motion may be imparted to shaft $F^2$ by any other suitable means, if desired, and the shaft $F^2$ may receive intermittent rotary motion by suitably-arranged devices, if desired. In this manner the saw-blade can be quickly set in proper position to the work and fed down during each stroke.

The operation of the machine is as follows: When the block of stone has been placed in position on its carriage, the blade is adjusted in proper position thereto by the shaft F' and its transmitting-gearing. The driving-shaft is then started, so that the sash commences its stroke. When arriving nearly at the end of the forward stroke, it is lifted by the toothed eccentric flanges of the rollers, so as to clear the kerf sufficiently for removing the débris. The saw commences then its return-stroke, and is lowered again into the kerf, exerting a cutting action thereon until it arrives nearly at the end of its return-stroke, when it is lifted again to give a clearance for the removal of the débris. At the end of each stroke the blade is fed forward by the alternating action of the pawls $h^2$ $h^4$ on the ratchet-wheel $h^3$, or of the shaft F', when so desired. By lifting the saw at the end of each stroke and lowering the same at the beginning of the next stroke, and by imparting a forward feed to the saw at or near each end of the stroke, the saw exerts a cutting action during the forward stroke and return-stroke, and accomplishes thereby the sawing of the stone in a quicker and more effective manner than when the saw is lifted from the kerf and moved clear of the same during the entire return-stroke, as heretofore.

I am aware that machines for sawing stones have been used in which the saw received during its longitudinal motion through the kerf a series of ascending and descending movements between the commencement and termination of its stroke, so as to supply a new quantity of sand, which, however, is not required in diamond-cutting machines, as these are worked without feeding sand into the kerf in front of the cutting-edge of the blade. My construction differs therefrom, inasmuch as the ascending and descending movements of the saw take place near the end of one stroke and at the beginning of the next stroke, so that the saw cuts in both directions without being lifted from the kerf while passing through its longitudinal motion in either direction.

Having thus described my invention, I claim as new and desire to secure by Letters Patent—

1. The combination, in a stone-sawing machine, of a reciprocating sash and a saw-blade provided with diamonds carried by said sash, means for feeding the blade in the sash without feeding the sash, and mechanism, substantially as described, for imparting successively a positive lifting and a lowering movement to the sash and also to the blade at or near the ends of each stroke, and a continuous rectilinear movement between the lowering movement at one end of the stroke and the lifting movement at the opposite end of the same stroke.

2. The combination, in a machine for sawing stone, of a reciprocating sash, a saw-blade provided with diamonds carried by said sash, longitudinally-grooved guideways, rollers on said guideways supporting said sash, provided with eccentric flanges for imparting successively a lifting and a lowering movement to the sash at or near the ends of each stroke, and devices, substantially as described, for imparting a continuous rectilinear movement to said sash between the lowering movement at one end of the stroke and the lifting movement at the opposite end of the same stroke.

3. The combination of a reciprocating sash, a saw-blade having transverse screw-nuts, vertical screw-rods, a hollow tubular shaft, bevel-gears connecting said shaft with the screw-rods, a square transmitting-shaft extending into said tubular shaft, a ratchet-wheel, spring-pawls engaging said ratchet-wheel, and being alternately actuated by the sash, and transmitting bevel-wheels between the ratchet-wheel and square shaft, substantially as set forth.

4. In a sawing-machine, the combination of the reciprocating sash and saw-blade with mechanism, substantially as described, for feeding said saw-blade near the end of each stroke of same without feeding the sash, as specified.

5. The combination of a reciprocating sash, a saw-blade having nuts at both ends, vertical screw-rods, transmitting bevel-gears, a tubular shaft turning in bearings on the sash, a square transmitting-shaft extending into said tubular shaft, transmitting bevel-wheels, a ratchet-wheel on the shaft of one of said bevel-wheels, a guided and spring-actuated rod having a spring-pawl engaging said ratchet-wheel, a lug on the sash engaging said rod, and a second spring-pawl, also engaging the ratchet-wheel, whereby the saw is fed forward at the end of each stroke, substantially as specified.

6. In a machine for sawing stone, a sash having downwardly-extending sides and a longitudinal brace connecting the lower ends of said sides below the stone-supporting carriage and its track, combined with the saw-blade which is attached to the vertical sides of said sash, substantially as set forth.

EMANUEL FOERSTER.

Witnesses:
HARRY M. TURK,
JOHN M. SPEER.